United States Patent
Beier

(10) Patent No.: US 9,829,087 B2
(45) Date of Patent: Nov. 28, 2017

(54) ACCESSORY GEARBOX DEVICE

(71) Applicant: Rolls-Royce Deutschland Ltd & Co KG, Blankenfelde-Mahlow (DE)

(72) Inventor: Juergen Beier, Schulzendorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1112 days.

(21) Appl. No.: 14/026,787

(22) Filed: Sep. 13, 2013

(65) Prior Publication Data
US 2015/0369355 A1 Dec. 24, 2015

(30) Foreign Application Priority Data
Sep. 20, 2012 (DE) .................... 10 2012 018 603

(51) Int. Cl.
| | |
|---|---|
| *F16H 57/04* | (2010.01) |
| *F01D 25/18* | (2006.01) |
| *F16H 57/02* | (2012.01) |
| *F16D 1/10* | (2006.01) |

(Continued)

(52) U.S. Cl.
CPC .......... *F16H 57/0431* (2013.01); *F01D 25/18* (2013.01); *F02C 7/32* (2013.01); *F02C 7/36* (2013.01); *F16D 1/10* (2013.01); *F16H 57/02* (2013.01); *F16H 57/043* (2013.01); *F16H 57/045* (2013.01); *F16H 57/0423* (2013.01); *F16H 57/0495* (2013.01);

(Continued)

(58) Field of Classification Search
CPC .... F16H 57/0431; F16H 57/045; F16H 57/02; F01D 25/18
See application file for complete search history.

(56) References Cited

U.S. PATENT DOCUMENTS 1,978,835 A * 10/1934 Cotterman .......... F16H 57/0447
184/13.1
3,889,780 A * 6/1975 Dison ...................... F02C 7/32
184/109

(Continued)

FOREIGN PATENT DOCUMENTS

| | | |
|---|---|---|
| DE | 754588 | 5/1951 |
| DE | 102009052595 A1 | 5/2011 |
| JP | H07-190176 | 7/1995 |

(Continued)

OTHER PUBLICATIONS

German Search Report dated Apr. 24, 2013 from counterpart application No. 10 2012 018 603.7.

(Continued)

*Primary Examiner* — William E Dondero
*Assistant Examiner* — Mark K Buse
(74) *Attorney, Agent, or Firm* — Shuttleworth & Ingersoll, PLC; Timothy J. Klima

(57) ABSTRACT

The present invention describes an accessory gearbox with a shaft incorporated into a casing and connectable at least in one lateral end area to an accessory unit, with the shaft at least in the lateral end area being designed as a hollow shaft having an inner toothing. To lubricate the inner toothing in the area of the casing at least one baffle device is provided which is designed for guiding hydraulic fluid present in the area of the casing, under the effect of gravity, in the direction of at least one opening provided in the shaft.

13 Claims, 2 Drawing Sheets

Figure 1:
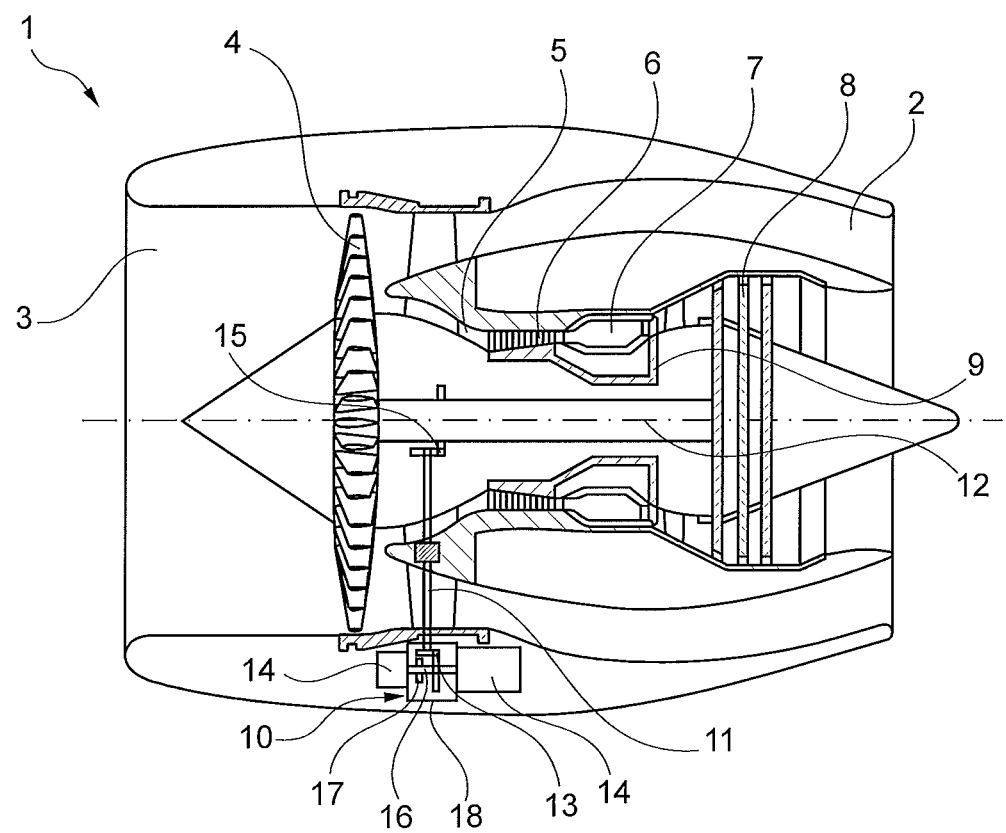

(51) Int. Cl.
*F02C 7/32* (2006.01)
*F02C 7/36* (2006.01)

(52) U.S. Cl.
CPC .. *F05D 2260/4031* (2013.01); *F16D 2300/06* (2013.01); *Y10T 74/19995* (2015.01)

(56) References Cited

U.S. PATENT DOCUMENTS 8,905,885 B2 12/2014 Yamamoto et al.
2013/0104681 A1 5/2013 Galivel

FOREIGN PATENT DOCUMENTS

WO 2011/148078 12/2011
WO 2012/105482 8/2012

OTHER PUBLICATIONS

European Search Report dated Jan. 20, 2014 for counterpart European Application No. 13184894.7.
Annex to European Search Report dated Jan. 23, 2015 from counterpart European Application No. 13184894.7.

* cited by examiner

ACCESSORY GEARBOX DEVICE

This application claims priority to German Patent Application DE102012018603.7 filed Sep. 20, 2012, the entirety of which is incorporated by reference herein.

This invention relates to an accessory gearbox with a shaft incorporated into a casing and connectable at least in one lateral end area to an accessory unit.

Accessory gearboxes for aircraft engines having several shafts each couplable to an accessory unit are known from practice. The shafts, designed as hollow shafts, have in a lateral end area a straight inner toothing for that purpose, using which an accessory unit can be coupled to the shaft. To ensure sufficient lubrication of the inner toothing, it is known to introduce oil for lubricating the inner toothing into the shaft via an oil nozzle arranged at a shaft end opposite the end area of the shaft couplable to the accessory unit. The oil is conveyed via various chambers to the straight toothing. It is also known to pass an oil nozzle through a hole in a side wall of the shaft and to supply the straight toothing with oil via this hole.

The provision of the oil nozzle and of lines required for it has however the drawback that it is complex and expensive.

The object underlying the present invention is to provide an accessory gearbox of the type specified at the beginning which is characterized by a simple and cost-effective design.

It is a particular object to provide a solution to the above problems by an accessory gearbox designed in accordance with features of the present disclosure.

An accessory gearbox is proposed with a shaft incorporated into a casing and connectable at least in one lateral end area to an accessory unit, with the shaft at least in the lateral end area being designed as a hollow shaft having an inner toothing. In accordance with the invention, at least one baffle device is provided to lubricate the inner toothing in the area of the casing, which baffle device is designed for guiding hydraulic fluid present in the area of the casing, in particular exclusively under the effect of gravity, in the direction of at least one opening provided in the shaft.

The accessory gearbox in accordance with the invention is of simple and cost-effective design, since for supplying the inner toothing with hydraulic fluid no oil nozzle or, for example, oil lines integrally cast into a gearbox casing are needed. Due to the in particular exclusively gravity-driven introduction of hydraulic fluid into the shaft, oil consumption can be considerably reduced compared with a design having an oil nozzle, since hydraulic fluid is introduced into a shaft interior substantially only while the shaft is stationary. In the operating state of the shaft, hydraulic fluid conveyed via the baffle device in the direction of the opening does not reach the interior of the shaft due to the rotation of the latter, since the hydraulic fluid is subjected to an outward force by the centrifugal force from a position supplied by the baffle device in the area of the opening, which prevents passage of the hydraulic fluid through the at least one opening.

Since only very small hydraulic fluid quantities are needed for lubricating the inner toothing, a hydraulic fluid quantity present in the area of the casing of the accessory gearbox and in particular in the area of the baffle device may already be sufficient for supplying the inner toothing.

A further advantage of an accessory gearbox in accordance with the invention is that unlike in designs with an oil nozzle, a lower proportion of hydraulic fluid has to be drained from the shaft, and as a result the efficiency of the system is improved. Furthermore, an outlet quantity of hydraulic fluid out of the shaft in the event of a loss of sealing by the accessory unit is limited due to the low quantities of hydraulic fluid in the shaft.

The baffle device can be designed such that it guides the hydraulic fluid either directly to the opening, or the baffle device is arranged at a distance from the opening in such a way that hydraulic fluid guided by the baffle device drips/flows due to gravity into an area of the opening.

In an advantageous embodiment of an accessory gearbox in accordance with the invention, it is provided that the baffle device is designed integral with the casing. A baffle device of this type can for example be provided in a simple manner together with the casing during the manufacture of said casing, usually by casting. Alternatively to that, the baffle device can also be designed as a separate component which is arranged on the casing using fastening means.

The baffle device is of particularly simple design when it is a channel integrated into the casing and by means of which hydraulic fluid present in the area of the casing is conveyed to the opening of the shaft.

In order to obtain a particularly dependable design of a hydraulic supply into the shaft using the baffle device, in particular in the case that the baffle device is arranged at a distance from the opening, the at least one opening can be arranged in a groove of the shaft that runs circumferentially in the radial direction.

If a tank intended for receiving hydraulic fluid is arranged in the area of the baffle device and is designed in particular for continuous dispensing of hydraulic fluid to the at least one baffle device in its state filled with hydraulic fluid, it can be ensured that sufficient hydraulic fluid is always conveyed in the direction of the opening of the shaft via the baffle device. The tank can for example be supplied with hydraulic fluid via an oil nozzle provided in the area of the baffle device for other consumers.

In an advantageous embodiment of an accessory gearbox in accordance with the invention, the opening can be designed for passing hydraulic fluid into a first chamber of the shaft, which in turn is designed for passing hydraulic fluid in the direction of the inner toothing during operation of the shaft.

The first chamber can in a simple embodiment of the accessory gearbox be delimited in the installed state of the accessory unit on the one hand by the accessory unit and/or a sealing device and on the other hand at least in some areas by a hydraulic fluid-guiding device.

The hydraulic fluid-guiding device can be designed for passing the hydraulic fluid from the opening into the first chamber, ensuring that hydraulic fluid entering the shaft via the opening completely reaches the first chamber of the shaft.

In a simple embodiment of an accessory gearbox in accordance with the invention, the hydraulic fluid-guiding device is designed in the manner of a hollow ring open at least in the area of the opening, where a surface of the hydraulic fluid-guiding device facing the center axis of the shaft in the direction of the first chamber is inclined in the direction of the center axis of the shaft, and the hydraulic fluid-guiding device in an area facing the first chamber has a passage opening for hydraulic fluid. The hydraulic fluid-guiding device is in particular designed substantially rotationally symmetrical, so that it can be manufactured appropriately simply and inexpensively and arranged in the shaft.

To allow hydraulic fluid to be drained from the first chamber of the shaft, the hydraulic fluid-guiding device can have at least one passage opening which is designed for passing hydraulic fluid from the first chamber into a second chamber of the shaft provided in particular in an area of the hydraulic fluid-guiding device facing away from the first chamber, when a hydraulic fluid quantity present in the first chamber exceeds a certain hydraulic fluid quantity limit while the shaft is stationary. The hydraulic fluid-guiding device can to that end have a passage hole for example in the area of a center axis of the shaft. Alternatively to this, the hydraulic fluid-guiding device can have, in particular in an area facing the first chamber, an area substantially closing off the cross-section of the shaft and having at least one opening in the zone of the center axis of the shaft. This ensures in a simple manner that hydraulic fluid introduced via the baffle device and the at least one opening into the shaft reaches the first chamber of the shaft. With the accessory gearbox in accordance with the invention, only two chambers are needed in the accessory gearbox shaft for sufficient supply of the inner toothing. In an alternative embodiment of the invention, the second chamber can also be formed by the hydraulic fluid-guiding device itself, where hydraulic fluid flows into a cavity of the hydraulic fluid-guiding device via a passage opening provided in said hydraulic fluid-guiding device when a limit level is exceeded.

To allow hydraulic fluid to be drained from the shaft in a simple way, at least one hydraulic fluid outlet opening can be provided in the area of the second chamber.

In a preferred embodiment of an accessory gearbox in accordance with the invention, the shaft has at an end facing away from an end couplable to the accessory unit a further inner toothing using which the shaft can be coupled to a further accessory unit. A total installation space of the accessory gearbox transverse to the extension direction of the center axis of the shaft can thereby be reduced if necessary, since no separate shaft has to be provided for the further accessory unit.

For lubricating the further inner toothing, a further baffle device can be provided which guides hydraulic fluid present in the area of the casing under the effect of gravity in the direction of at least one further opening provided in the shaft.

Figure 2:
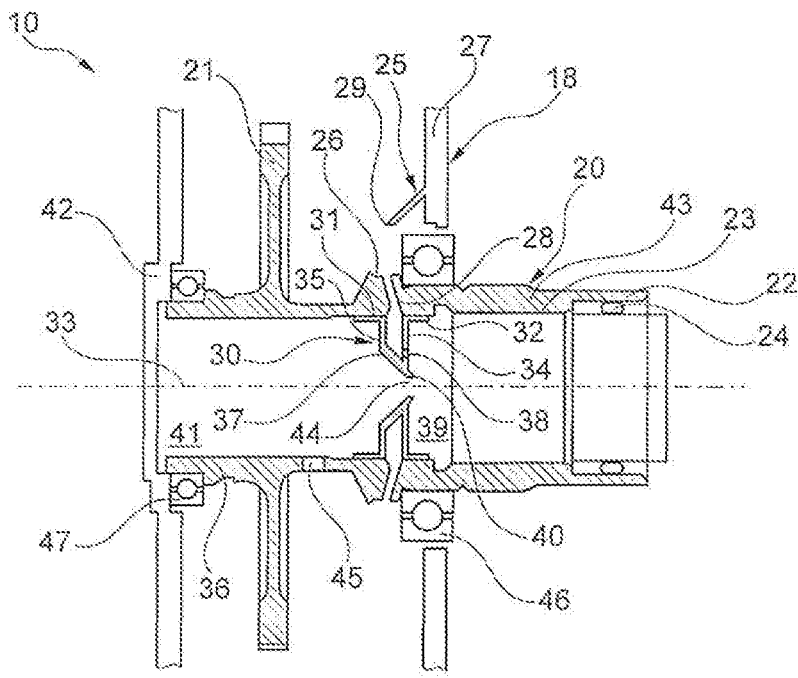
Figure 3:
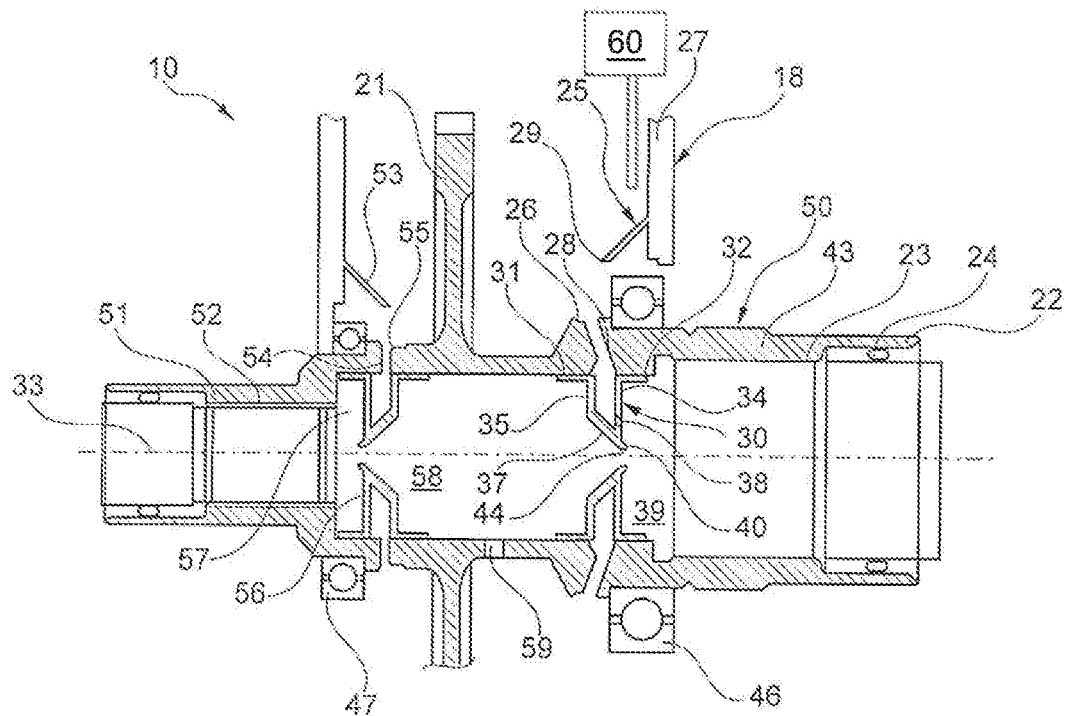

FIG. 1 shows a highly schematized longitudinal sectional view of a jet engine featuring an accessory gearbox arranged substantially in the radial direction outside of a bypass duct of the jet engine, FIG. 2 shows a simplified sectional representation of a cutout of the accessory gearbox as per FIG. 1 with a shaft being connectable to an accessory unit, and FIG. 3 shows a simplified sectional view of a cutout of the accessory gearbox as per FIG. 1 with an alternatively designed shaft that is connectable to two accessory units.

FIG. 1 shows a jet engine 1 for an aircraft, which is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7, a low-pressure turbine 8 intended for powering the fan 4 and a high-pressure turbine 9 intended for powering the compressor device 6.

Furthermore, a schematically illustrated accessory gearbox 10 is shown which is arranged substantially in the radial direction outside the bypass duct 2 and includes a drive shaft 11 via which the accessory gearbox 10 is connected to a center engine shaft 12. The drive shaft 11 is in the present invention operatively connected to a high-pressure shaft of the engine shaft 12 by means of a bevel gear toothing 15, said high-pressure shaft rotating in the operating state of the jet engine 1 at a higher speed than a low-pressure shaft arranged coaxially thereto and linked to the fan 4.

The drive shaft 11 drives via gear pairings 13 an accessory gearbox shaft 16 of the accessory gearbox 10, which in turn drives further accessory gearbox shafts—not shown in detail in FIG. 1—via a gear 17. The accessory gearbox shafts 16 are couplable to various accessory units 14 and auxiliaries, respectively, such as for example a fuel pump, a hydraulic pump, a bleed unit, a generator or a pneumatic starter, and are arranged in a common casing 18.

FIG. 2 shows an accessory gearbox shaft 20 of the accessory gearbox 10 which interacts via a gear 21 directly or indirectly with the accessory gearbox shaft 16.

The accessory gearbox shaft 20 is here designed overall as a hollow shaft and has in a first end area 22 an inner toothing 23 via which an accessory unit 14 designed with a corresponding outer toothing can be coupled to the accessory gearbox shaft 20. The end area 22 of the accessory gearbox shaft 20 is sealed in the installed state of the accessory unit 14 against any leakage of hydraulic fluid, in particular of oil, by a sealing device 24 indicated schematically here and arranged in the first end area 22.

To supply the straight toothing 23 with hydraulic fluid and to lubricate it, a gravity-driven hydraulic fluid supply is provided. Hydraulic fluid present for example as a spray mist and on walls of the casing 18 is here passed via a baffle device 25 exclusively by the effect of gravity in the direction of an opening 28 located in a circumferential groove 26 of the accessory gearbox shaft 20, and through this opening into an interior of the accessory gearbox shaft 20. Alternatively to this, several openings in particular designed as holes can also be arranged offset to one another in the groove.

In particular, in an area of a wall 27 of the casing 18 above the baffle device 25, a tank 60 can be arranged in an alternative embodiment of the invention, and is for example filled with hydraulic fluid by an oil nozzle provided for supplying the gear 21 with hydraulic fluid and in particular continuously supplies the baffle device 25 with hydraulic fluid. It can be ensured with a tank 60 of this type that sufficient hydraulic fluid is conveyed via the baffle device 25 in the direction of the opening 28.

The baffle device 25 is designed in the present invention in the form of a nose integrally cast into the casing 18 and which due to gravity guides hydraulic fluid running down a wall 27 of the casing 18 into an area above the hole/opening 28. Hydraulic fluid drips from a tip 29 of the baffle device 25 by gravity into an area of the groove 26 and the opening 28. When the accessory gearbox shaft 20 is stationary, or when the accessory gearbox shaft 20 is rotating at a low speed, the hydraulic fluid is also passed, driven by gravity, through the opening 28. In the operating state of the accessory gearbox shaft 20, the accessory gearbox shaft 20 rotates at a speed which exerts a centrifugal force on hydraulic fluid present in the area of the groove 26 of the accessory gearbox shaft 20, said force preventing hydraulic fluid from passing through the opening into the accessory gearbox shaft 20. As a result, hydraulic fluid enters the accessory gearbox shaft 20 via the opening 28 substantially when the accessory gearbox shaft 20 is stationary.

In the accessory gearbox shaft 20, a hydraulic fluid-guiding device 30 of essentially rotationally symmetrical design is arranged in the area of the opening 28 and is substantially a hollow ring with an open side in the area of the opening 28. The hydraulic fluid-guiding device 30 has in cross-section next to the opening 28 side sections 31, 32 arrangeable on an inner wall of the accessory gearbox shaft 20, and limiting walls 34, 35 extending from said side sections in the direction of a center axis 33 of the accessory gearbox shaft 20, of which a first limiting wall 34 faces the first end area 22 of the accessory gearbox shaft 20 and a second limiting wall 35 faces the second end area 36 of the accessory gearbox shaft 20 which faces away from the first end area 22. The limiting walls 34, 35 are, again viewed in cross-section, delimited in an area facing the center axis 33 by an inner wall 37 which is designed inclined, i.e. the inner wall 37 projects in the area of the first limiting wall 34 further in the direction of the center axis 33 than in the area of the second limiting wall 35.

Via the opening 28, which has a size sufficient for hydraulic fluid to pass through, hydraulic fluid drains, when the accessory gearbox shaft 20 is stationary, into the accessory gearbox shaft 20, drips onto the inner wall 37 of the hydraulic fluid-guiding device 30 and is passed, through a passage opening 38 provided in an area of the first limiting wall 34 facing the inner wall 37, into a first chamber 39 of the accessory gearbox shaft 20, which is delimited in the installed state of the accessory unit 14 on the one hand by the accessory unit 14 and the sealing device 24 and on the other hand by the first limiting wall 34 of the hydraulic fluid-guiding device 30.

To ensure that hydraulic fluid passed through the opening 28 into the accessory gearbox shaft 20 reaches the first chamber 39, a drip edge 40 is provided in an intersection area of the first limiting wall 34 and of the inner wall 37 of the hydraulic fluid-guiding device 30. The drip edge 40 prevents hydraulic fluid from entering, from the inner wall 37 of the hydraulic fluid-guiding device 30, directly a second chamber 41 of the accessory gearbox shaft 20, which is delimited in the second end area 36 of the accessory gearbox shaft 20 by a casing element 42 and on the other hand by the second limiting wall 35 and the inner wall 37 of the hydraulic fluid-guiding device 30. Sealing between the casing element 42 and the accessory gearbox shaft 20 is not required.

Alternatively to the drip edge 40, the first limiting wall can, apart from the passage opening 38, be substantially continuous, i.e. substantially closing the entire cross-section of the accessory gearbox shaft 20.

The hydraulic fluid passed into the first chamber 39 spreads due to the centrifugal force during operation of the accessory gearbox shaft 20 over an inner wall 43 of the first chamber 39 and from there is conveyed for lubrication of the straight toothing 23 and spread along said straight toothing 23.

If a hydraulic quantity present in the first chamber 39 exceeds a hydraulic fluid quantity limit when the accessory gearbox shaft 20 is stationary or if a limit level is exceeded, hydraulic fluid flows from the first chamber 39 through a passage opening 44 formed by the drip edge 40 of the hydraulic fluid-guiding device 30 into the second chamber 41. The hydraulic fluid present in the first chamber 39 flows into the second chamber 41 when a hydraulic level prevailing in the first chamber 39 rises above a shoulder formed by the first limiting wall 34 of the hydraulic fluid-guiding device 30. Hydraulic fluid is drained from the accessory gearbox shaft 20 via an outlet hole 45 provided in the second chamber 41.

Alternatively to the outlet hole 45, it can also be provided that the hydraulic fluid-guiding device 30 has a further passage opening corresponding to the passage opening 38, and arranged in the hydraulic fluid-guiding device 30 offset by about 180° relative to said passage opening 38. If a hydraulic level prevailing in the first chamber 39 reaches and rises above the further passage opening, hydraulic fluid passes through the latter into the hollow interior of the hydraulic fluid-guiding device 30 and can be drained from the accessory gearbox shaft 20 via a further opening offset to the opening 28 by about 180° in the accessory gearbox shaft 20.

The chambers 39 and 41 ensure a sufficient supply of the inner toothing 23 with hydraulic fluid, appropriate distribution of hydraulic fluid inside the accessory gearbox shaft 20 and drainage of hydraulic fluid out of the accessory gearbox shaft 20.

Hydraulic fluid present in the accessory gearbox shaft 20 can, due to the provision of holes not shown in detail in the accessory gearbox shaft 20, also be used to lubricate bearings 46, 47 provided in the area of the accessory gearbox shaft 20.

FIG. 3 shows an exemplary embodiment of an accessory gearbox shaft 50 designed for linking of two accessory units. The accessory gearbox shaft 50 is largely identical in design to the accessory gearbox shaft 20. However, the accessory gearbox shaft 50 has in a second end area 51 not a wall 42 of the casing 18, but a further inner toothing 52 via which the accessory gearbox shaft 50 can be coupled to a further accessory unit 14. The second end area 51 is designed substantially comparable to the first end area 22.

For lubrication of the further inner toothing 52 with hydraulic fluid, a further baffle device 53 is provided which guides hydraulic fluid to a further opening 54 arranged in a further circumferential groove 55 in the accessory gearbox shaft 50. Hydraulic fluid guided through the opening 54 into the accessory gearbox shaft 50 is passed by a further hydraulic fluid-guiding device 56 into a third chamber 57 of the accessory gearbox 50.

The elements 51 to 57 for arrangement of the further accessory unit with the accessory gearbox shaft 50 are designed substantially identical in construction and function and mirror-inverted to the corresponding elements for arrangement of the accessory unit in the first end area 22 of the accessory gearbox shaft 50, where a second chamber 58 of the accessory gearbox shaft 50 is delimited on the one hand by the hydraulic fluid-guiding device 30 and on the other hand by the further hydraulic fluid-guiding device 56. Accordingly, hydraulic fluid passed both from the first chamber 39 into the second chamber 58 and from the third chamber 57 into the second chamber 58 can be drained from the accessory gearbox shaft 50 via an outlet hole 59 arranged in the second chamber 58.

LIST OF REFERENCE NUMERALS

1 Jet engine
2 Bypass duct
3 Intake area
4 Fan
5 Engine core
6 Compressor device
7 Burner
8 Low-pressure turbine
9 High-pressure turbine
10 Accessory gearbox
11 Drive shaft
12 Engine shaft
13 Gear pairing
14 Accessory unit
15 Bevel gear toothing 16 Accessory gearbox shaft
17 Gear
18 Casing
20 Accessory gearbox shaft
21 Gear
22 First end area of accessory gearbox shaft
23 Inner toothing
24 Sealing device
25 Baffle device
26 Groove
27 Wall of casing
28 Opening
29 Tip of baffle device
30 Hydraulic fluid-guiding device
31 Side section
32 Side section
33 Center axis
34 First limiting wall
35 Second limiting wall
36 Second end area of accessory gearbox shaft
37 Inner wall
38 Passage opening
39 First chamber of accessory gearbox shaft
40 Drip edge
41 Second chamber of accessory gearbox shaft
42 Casing element
43 Inner wall
44 Passage opening
45 Outlet hole
46 Bearing
47 Bearing
50 Accessory gearbox shaft
51 Second end area of accessory gearbox shaft
52 Further inner toothing
53 Further baffle device
54 Further opening
55 Further groove
56 Further hydraulic fluid-guiding device
57 Third chamber
58 Second chamber
59 Outlet hole

What is claimed is:

1. An accessory gearbox comprising:
a casing;
a shaft incorporated into the casing, the shaft including a first end by which the shaft can be connected to an accessory unit, the shaft including a hollow portion including, in the first end, an inner toothing, the shaft including an opening extending from an exterior of the shaft to an interior of the shaft
a baffle device arranged for lubricating the inner toothing by guiding, under gravity, hydraulic fluid present in an area of the casing in a direction of the opening in the shaft;
wherein the shaft includes, at a second end opposite the first end, a further inner toothing by which the shaft can be connected to a further accessory unit;
wherein the shaft includes a first chamber positioned in the interior of the shaft and open to the inner toothing and the opening connects to the first chamber of the shaft for passing hydraulic fluid to the inner toothing during operation of the shaft;
a hydraulic fluid-guiding device positioned in the interior of the shaft, wherein the first chamber is delimited in an installed state of the accessory unit by at least one chosen from the accessory unit and a sealing device, the first chamber also being delimited at least in some areas by the hydraulic fluid-guiding device;
wherein the hydraulic fluid-guiding device includes a hollow ring open at least in an area of the opening, where a surface of the hydraulic fluid-guiding device facing a center axis of the shaft is inclined in a direction of the first chamber in a direction of the center axis of the shaft, and the hydraulic fluid-guiding device includes a passage opening for the hydraulic fluid in an area facing the first chamber.

2. The accessory gearbox in accordance with claim 1, wherein the baffle device is integral with the casing.

3. The accessory gearbox in accordance with claim 1, wherein the baffle device includes a channel integral with the casing.

4. The accessory gearbox in accordance with claim 1, wherein the shaft includes a groove extending circumferentially in a radial direction and the opening is arranged in the groove.

5. The accessory gearbox in accordance with claim 1, and further comprising a tank for receiving hydraulic fluid, the tank arranged in an area of the baffle device and including a tank opening for continuous dispensing of hydraulic fluid to the baffle device.

6. The accessory gearbox in accordance with claim 1, and further comprising a first chamber positioned in the interior of the shaft and open to the inner toothing, the hydraulic fluid-guiding device arranged to pass the hydraulic fluid from the opening into the first chamber.

7. The accessory gearbox in accordance with claim 1, wherein the shaft includes a second chamber positioned in the interior of the shaft and the hydraulic fluid-guiding device includes a passage opening for passing hydraulic fluid from the first chamber into the second chamber of the shaft, when a hydraulic fluid quantity present in the first chamber exceeds a hydraulic fluid quantity limit of the first chamber while the shaft is stationary.

8. The accessory gearbox in accordance with claim 7, wherein the shaft includes a hydraulic fluid outlet opening connected to the second chamber to allow hydraulic fluid to be drained from the shaft.

9. The accessory gearbox in accordance with claim 1, and further comprising:
a further opening extending from the exterior of the shaft to the interior of the shaft, and
a further baffle device arranged for lubricating the further inner toothing by guiding, under gravity, the hydraulic fluid present in the area of the casing in a direction of the further opening.

10. The accessory gearbox in accordance with claim 9, and further comprising a further hydraulic fluid-guiding device positioned in the interior of the shaft, and a third chamber positioned in the interior of the shaft and open to the further inner toothing, the further hydraulic fluid-guiding device arranged to pass hydraulic fluid from the further opening of the shaft into the third chamber of the shaft.

11. The accessory gearbox in accordance with claim 10, wherein the shaft includes a second chamber positioned in the interior of the shaft between the first chamber and the third chamber and the further hydraulic fluid-guiding device includes a further passage opening for passing hydraulic fluid from the third chamber into the second chamber of the shaft when a hydraulic fluid quantity present in the third chamber exceeds a second hydraulic fluid quantity limit of the third chamber while the shaft is stationary.

12. An accessory gearbox comprising:
a casing;
a shaft incorporated into the casing, the shaft including a first end by which the shaft can be connected to an accessory unit, the shaft including a hollow portion including, in the first end, an inner toothing, the shaft including an opening extending from an exterior of the shaft to an interior of the shaft
a baffle device arranged for lubricating the inner toothing by guiding, under gravity, hydraulic fluid present in an area of the casing in a direction of the opening in the shaft;
wherein the shaft includes, at a second end opposite the first end, a further inner toothing by which the shaft can be connected to a further accessory unit;
wherein the shaft includes a first chamber positioned in the interior of the shaft and open to the inner toothing and the opening connects to the first chamber of the shaft for passing hydraulic fluid to the inner toothing during operation of the shaft;
a hydraulic fluid-guiding device positioned in the interior of the shaft, wherein the first chamber is delimited in an installed state of the accessory unit by at least one chosen from the accessory unit and a sealing device, the first chamber also being delimited at least in some areas by the hydraulic fluid-guiding device;
wherein the shaft includes a second chamber positioned in the interior of the shaft and the hydraulic fluid-guiding device includes a passage opening for passing hydraulic fluid from the first chamber into the second chamber of the shaft, when a hydraulic fluid quantity present in the first chamber exceeds a hydraulic fluid quantity limit of the first chamber while the shaft is stationary.

13. An accessory gearbox comprising:
a casing;
a shaft incorporated into the casing, the shaft including a first end by which the shaft can be connected to an accessory unit, the shaft including a hollow portion including, in the first end, an inner toothing, the shaft including an opening extending from an exterior of the shaft to an interior of the shaft;
a baffle device arranged for lubricating the inner toothing by guiding, under gravity, hydraulic fluid present in an area of the casing in a direction of the opening in the shaft;
wherein the shaft includes, at a second end opposite the first end, a further inner toothing by which the shaft can be connected to a further accessory unit;
a further opening extending from the exterior of the shaft to the interior of the shaft;
a further hydraulic fluid-guiding device positioned in the interior of the shaft, and a third chamber positioned in the interior of the shaft and open to the further inner toothing, the further hydraulic fluid-guiding device arranged to pass hydraulic fluid from the further opening of the shaft into the third chamber of the shaft;
wherein the shaft includes a second chamber positioned in the interior of the shaft between the first chamber and the third chamber and the further hydraulic fluid-guiding device includes a further passage opening for passing hydraulic fluid from the third chamber into the second chamber of the shaft when a hydraulic fluid quantity present in the third chamber exceeds a second hydraulic fluid quantity limit of the third chamber while the shaft is stationary.

* * * * *